(12) United States Patent
Fowe et al.

(10) Patent No.: US 10,546,490 B2
(45) Date of Patent: Jan. 28, 2020

(54) METHOD AND APPARATUS FOR IDENTIFYING A TRANSPORT MODE OF PROBE DATA

(71) Applicant: HERE GLOBAL B.V., Eindhoven (NL)

(72) Inventors: James Fowe, Chicago, IL (US); Filippo Pellolio, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 148 days.

(21) Appl. No.: 15/721,108

(22) Filed: Sep. 29, 2017

(65) Prior Publication Data
US 2019/0103019 A1  Apr. 4, 2019

(51) Int. Cl.
| G08G 1/01 | (2006.01) |
| G01C 21/30 | (2006.01) |
| G01C 21/34 | (2006.01) |
| G01S 19/42 | (2010.01) |
| G01S 19/52 | (2010.01) |
| G01S 19/24 | (2010.01) |

(52) U.S. Cl.
CPC ........... *G08G 1/0133* (2013.01); *G01C 21/30* (2013.01); *G01S 19/42* (2013.01); *G01S 19/52* (2013.01); *G01C 21/3423* (2013.01); *G01S 19/24* (2013.01)

(58) Field of Classification Search
CPC .... G08G 1/0133; G08G 1/015; G08G 1/0112; G08G 1/012; G01S 19/52; G01S 1/015; G01S 19/42; G01S 19/24; G01C 21/30; G01C 21/3423; G01C 21/32
See application file for complete search history.

(56) References Cited

U.S. PATENT DOCUMENTS

| 6,385,539 B1 | 5/2002 | Wilson et al. |
| 9,558,660 B1 | 1/2017 | Fowe et al. |
| 2009/0216704 A1 | 8/2009 | Zheng et al. |
| 2011/0153195 A1* | 6/2011 | Broadbent ......... G01C 21/3626 701/533 |

(Continued)

FOREIGN PATENT DOCUMENTS

WO  2016016760 A1  2/2016

OTHER PUBLICATIONS

Office Action for related European Patent Application No. 18197774.5-1003, dated Mar. 8, 2019, 12 pages.

(Continued)

*Primary Examiner* — Mussa A Shaawat
(74) *Attorney, Agent, or Firm* — Ditthavong & Steiner, P.C.

(57) ABSTRACT

An approach is provided for determining probe data generated by a device travelling on a road segment is for pedestrian travel. A lane matching platform determines a speed of a probe point. The lane matching platform also determines a spatial distance of the probe point from a center line vector of a road segment. The lane matching platform also determines an allowed transport mode for the road segment. The lane matching platform further identifies the transport mode of the probe point based on the speed, the location of the probe point with respect to the center line, and the allowed transport mode. The transport mode, the allowed transport mode, or a combination thereof includes a car transport mode or a pedestrian transport mode.

20 Claims, 16 Drawing Sheets

(56) References Cited

U.S. PATENT DOCUMENTS

| | | | |
|---|---|---|---|
| 2011/0238291 A1* | 9/2011 | Bach | G01C 21/32 |
| | | | 701/533 |
| 2013/0268236 A1* | 10/2013 | Yuen | A61B 5/0002 |
| | | | 702/160 |
| 2014/0143184 A1* | 5/2014 | Koukoumidis | G01C 21/32 |
| | | | 706/12 |
| 2015/0146919 A1 | 5/2015 | Ryu et al. | |
| 2015/0285639 A1 | 10/2015 | Basalamah et al. | |
| 2016/0091609 A1 | 3/2016 | Ismail et al. | |
| 2016/0180705 A1* | 6/2016 | Liu | G08G 1/0116 |
| | | | 701/117 |
| 2016/0293001 A1* | 10/2016 | Xu | G08G 1/0133 |
| 2016/0327397 A1 | 11/2016 | Cordova et al. | |
| 2016/0335887 A1* | 11/2016 | Dorum | G01C 21/26 |
| 2016/0358477 A1 | 12/2016 | Ansari | |
| 2017/0098167 A1* | 4/2017 | Hayashida | G01C 21/3492 |
| 2017/0352262 A1* | 12/2017 | Xu | G08G 1/0112 |
| 2018/0158325 A1* | 6/2018 | Bernhardt | G01C 21/3415 |
| 2018/0202816 A1* | 7/2018 | Kesting | G01C 21/32 |
| 2018/0286228 A1* | 10/2018 | Xu | G08G 1/07 |
| 2019/0025837 A1* | 1/2019 | Conor | G05D 1/0214 |

OTHER PUBLICATIONS

Zheng et al., "Learning Transportation Mode from Raw GPS Data for Geographic Applications on the Web", Proceedings of the 17th World Wide Web Conference, Apr. 2008, 10 pages.

Tian et al., "Automated Human Mobility Mode Detection Based on GPS Tracking Data", Published in 2014 22nd International Conference on Geoinformatics, Jun. 25, 2014, 6 pages.

Ren, "Advanced Map Matching Technologies and Techniques for Pedestrian/wheelchair Navigation", D—Scholarship, 2012, 202 Pages.

Rogers et al., "Mining Gps Data to Augment Road Models", Proceedings of the fifth International conference on Knowledge Discovery and Data Mining, 1999, 11 Pages.

Qiu et al., "Road Map Inference: a Segmentation and Grouping Framework", ISPRS International Journal of Geo-Information, vol. 5, No. 8, Jul. 23, 2016, 20 Pages.

* cited by examiner

230

240

260

900

METHOD AND APPARATUS FOR IDENTIFYING A TRANSPORT MODE OF PROBE DATA

BACKGROUND

Service providers and device manufacturers (e.g., wireless, cellular, etc.) are continually challenged to deliver value and convenience to consumers by, for example, providing compelling network services. One area of interest has been the development of services for tracking device users as they travel along roadways and/or navigate to different destinations, including global positioning system (GPS) based services. For example, a routing service may collect and process GPS probe data (e.g., probe points) generated by a device during driving of a vehicle to determine the vehicle's location and generate corresponding mapping or routing data. Unfortunately, service providers are limited in their ability to distinguish between GPS probe data corresponding to a pedestrian mode of travel versus vehicular travel. Resultantly, services relying on analysis of this GPS probe data for navigation processing cannot accurately determine pedestrian mobility and travel flows for a given road segment.

SOME EXAMPLE EMBODIMENTS

Therefore, there is a need for an approach for identifying a transport mode of a probe point.

According to one embodiment, a method comprises determining, by the processor, a speed of a probe point. The method also comprises determining, by the processor, a spatial distance of the probe point from a center line vector of a road segment. The method also comprises determining, by the processor, an allowed transport mode for the road segment. The method further comprises identifying, by the processor, the transport mode of the probe point based on the speed, the location of the probe point with respect to the center line, and the allowed transport mode. The transport mode, the allowed transport mode, or a combination thereof includes a car transport mode or a pedestrian transport mode.

According to another embodiment, an apparatus comprises at least one processor, and at least one memory including computer program code for one or more computer programs, the at least one memory and the computer program code configured to, with the at least one processor, cause, at least in part, the apparatus to determine a speed of a probe point. The apparatus is also caused to determine a spatial distance of the probe point from a center line vector of a road segment. The apparatus is also caused to determine an allowed transport mode for the road segment. The apparatus is further caused to identify the transport mode of the probe point based on the speed, the location of the probe point with respect to the center line, and the allowed transport mode. The transport mode, the allowed transport mode, or a combination thereof includes a car transport mode or a pedestrian transport mode.

According to another embodiment, a computer-readable storage medium carries one or more sequences of one or more instructions which, when executed by one or more processors, cause, at least in part, an apparatus to determine a speed of a probe point. The apparatus is also caused, at least in part, to determine a spatial distance of the probe point from a center line vector of a road segment. The apparatus is also caused, at least in part, to determine an allowed transport mode for the road segment. The apparatus is further caused, at least in part, to identify, by the processor, the transport mode of the probe point based on the speed, the location of the probe point with respect to the center line, and the allowed transport mode. The transport mode, the allowed transport mode, or a combination thereof includes a car transport mode or a pedestrian transport mode.

According to another embodiment, an apparatus comprises means for causing, at least in part, a determining of a speed of a probe point. The apparatus also comprises means for causing, at least in part, a determining of a spatial distance of the probe point from a center line vector of a road segment. The apparatus also comprises means for determining an allowed transport mode for the road segment. The apparatus further comprises means for, at least in part, identifying the transport mode of the probe point based on the speed, the location of the probe point with respect to the center line, and the allowed transport mode. The transport mode, the allowed transport mode, or a combination thereof includes a car transport mode or a pedestrian transport mode.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining probe data generated by a device travelling on a road segment is for pedestrian travel is disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form to avoid unnecessarily obscuring the embodiments of the invention.

Figure 1:
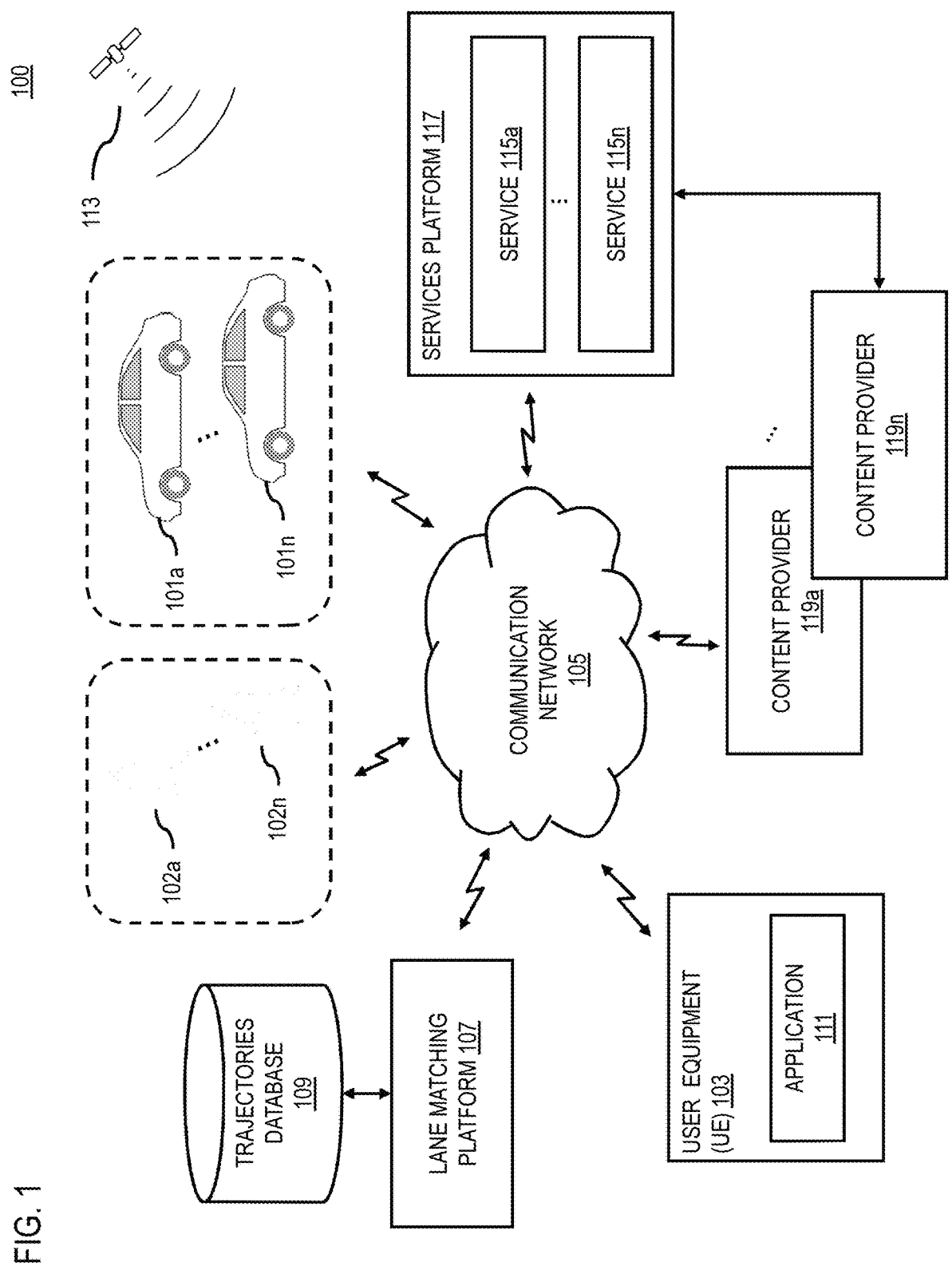
FIG. 1 is a diagram of a system for identifying a transport mode of a probe point, according to one embodiment.

FIG. 1 is a diagram of a system capable of identifying a transport mode of a probe point, according to one embodiment. For the purpose of illustration herein, a road segment may include a roadway link that extends about a geographic area. Each road segment includes at least a beginning node and a terminating node, where each node serves as a connection point (e.g., an intersection, an entranceway) to another road segment, a terminating point of the current road segment, etc. The network of road segments and/or nodes may be stored to a geographic information system/database (e.g., database 109) for use by various location based services. Road segments may also be associated with attributes, such as geographic coordinates, street names, address ranges, speed limits, turn restrictions at intersections, and other navigation related attributes, as well as points of interest (POIs), such as gasoline stations, hotels, restaurants, museums, stadiums, offices, automobile dealerships, auto repair shops, buildings, stores, parks, bridges, tunnels, etc. In certain instances, attributes regarding the lanes of a road segment, such as lane count, direction and type (e.g., pedestrian, bike, car, car pool) may also be maintained by the geographic information system.

Location based services such as mapping and navigation services or traffic services may access the above described database to provide real-time navigation instructions, visual maps, travel recommendations or the like to requesting travelers. The ability of service providers to generate and convey such information is based on the service's ability to track the real-time location, position, direction/bearing, time, etc., of devices traveling the road segment. Typically, these services rely upon global positioning service (GPS) probe data for enabling such tracking, wherein a device such as an onboard navigator or a vehicle or mobile phone serves as a probing mechanism. Under this scenario, the probe employs various sensors to collect the relevant tracking data and communicates this information as probe data to one or more GPS satellites available to the service providers. GPS probe data may be persistently shared as one or more data packets or strings thereof for specifying the current latitude, longitude, altitude, heading, speed, precision, etc., of the vehicle.

Unfortunately, service providers are limited in their ability to distinguish between probe data corresponding to pedestrian travel versus vehicular travel. For example, it is difficult for location based services to process probe data produced on pedestrian lanes due to map-matching problems—i.e., probes on pedestrian lanes easily get matched to the car lanes. Close proximity of a pedestrian lane and adjacent vehicle lane may lead to spatial errors between probes where movement of a pedestrian (e.g., person) is interpreted as driving in congestion, bike travel, etc. Thus, noisy GPS probes cannot be readily map-matched to pedestrian lanes, which further inhibits the ability of services to obtain analytic insights of pedestrian travel flow for a given road segment.

To address this issue, system 100 of FIG. 1 enables location based services (e.g., navigation systems, routing applications) used by a vehicle or pedestrian in connection with user equipment (e.g., a mobile device) to accurately determine pedestrian travel from vehicle travel along a road segment. In one embodiment, the system 100 can determine a number of lanes there are for a road segment based on clustering of historic probe points for the road segment. This may include, for example, determining the respective spatial distances of each historic probe point within the cluster for a given period from a line vector placed in the direction of travel (e.g., virtually or assumed) at the midpoint of the road segment and analyzing the probes respective spatial distributions. The system 100 may analyze the peaks of a multi-modality pattern as generated per respective spatial distances of probes within the cluster, wherein the peaks indicate the most commonly travelled spatial distances and thus the most likely lane-partitions of the road segment.

In another embodiment, the system 100 may further determine a transport mode and/or state to associate with a device (e.g., user equipment (UE) 103) and/or probe points generated during travel along a road segment. The transport mode may correspond to an operational state, a travel modality, a vehicle or UE type, etc. This includes a pedestrian transport mode or vehicle transport mode for indicating a form or type of travel. The corresponding transport mode may also specify or be associated with a type of lane travelled on by a pedestrian or vehicle relative to a current set of probe points produced, i.e., a pedestrian lane or vehicle lane. By way of example, the "pedestrian state" corresponds to walking, running or any form/mode of travel executed by a person without the support of mechanical, motorized or other vehicular or transport means. In contrast, the "vehicle state" corresponds to any form/mode of travel involving mechanical and/or motorized vehicular or other transport means (e.g., bicycle, car, hovercraft). The system 100 infers a specific lane and lane-level position of the device and/or probe points during travel on the road segment based on prior analyzed spatial distribution clusters as well as hidden state modeling and inference processing. As will be discussed further later herein, the hidden state modeling and inference processing may be performed in accordance with known Hidden Markov Modeling (HMM) and related Viterbi algorithm processing techniques respectively.

In one embodiment, a lane matching platform 107 of system 100 operates in connection with one or more user equipment (UE) 103. By way of example, the UE 103 may be an in-vehicle navigation system as operated by one or more vehicles 101a-101n (collectively referred to herein as vehicles 101). Though depicted as automobiles, it is contemplated the vehicles 101 can be any type of transportation vehicle manned or unmanned (e.g., planes, aerial drone vehicles, motor cycles, boats, bicycles, etc.). Alternatively, the UE 103 may be operated by one or more pedestrians 102a-102n (collectively referred to herein as pedestrians 102) as a personal navigation device ("PND"), a portable navigation device, a cellular telephone, a mobile phone, a personal digital assistant ("PDA"), a watch, a camera, a computer and/or any other device that supports location based services, i.e., digital routing and map display. It is contemplated, in future embodiments, that a device employed by a pedestrian may be interfaced with an on-board navigation system of an autonomous vehicle or physically connected to the vehicle for serving as the navigation system. Also, the UE 103 may be configured to access a communication network 105 by way of any known or still developing communication protocols.

Also, the UE 103 may be configured with applications 111a-111n (also collectively referred to as applications 111) for interacting with one or more content providers 119a-119n, services 115a-115n of a service platform 117, or a combination thereof. The application 111 may be any type of application that is executable at the vehicle 101 and/or the UE 103, such as mapping applications, location-based service applications, navigation applications, content provisioning services, camera/imaging applications, media player applications, social networking applications, calendar applications, and the like. In one embodiment, the application 111 may act as a client for the lane matching platform 107 and perform one or more functions of the lane matching platform 107 alone or in combination with the lane matching platform 107. The content providers 119a-119n (collectively referred to as content providers 119) and services 115a-115n (collectively referred to as services 115) rely upon the gathering of probe data, such as at the request of the application 111, for executing its functions and/or services.

The UEs 103 may be configured with various sensors (not shown for illustrative convenience) for acquiring and/or generating probe data regarding a vehicle 101, a driver, a pedestrian 102, other vehicles, conditions regarding the driving environment or roadway, etc. For example, sensors may be used as GPS receivers for interacting with one or more satellites 113 to determine and track the current speed, position and location of a vehicle travelling along a roadway. In addition, the sensors may gather tilt data (e.g., a degree of incline or decline of the vehicle during travel), motion data, light data, sound data, image data, weather data, temporal data and other data associated with the vehicle and/or UEs 103 thereof. Still further, the sensors may detect local or transient network and/or wireless signals, such as those transmitted by nearby devices during navigation of a vehicle along a roadway (Li-Fi, near field communication (NFC)) etc. This may include, for example, network routers configured within a premise (e.g., home or business), another UE 103 or vehicle or a communicable traffic system (e.g., traffic lights, traffic cameras, traffic signals, digital signage).

It is noted therefore that the above described data may be transmitted to the satellites 113 via communication network 105 as GPS probe data according to any known wireless communication protocols. For example, each vehicle 101 and/or UE 103 may be assigned a unique probe identifier (probe ID) for use in reporting or transmitting said probe data collected by the vehicles 101 and UEs 103. In one embodiment, each vehicle 101 and/or UE 103 is configured to report probe data as probe points, which are individual data records collected at a point in time that records telemetry data. Probe points can be collected by the system 100 from the vehicles 101 and/or UEs 103 in real-time, in batches, continuously, or at any other frequency requested by the system 100 over, for instance, the communication network 105 for processing by the lane matching platform 107.

In one embodiment, the lane matching platform 107 retrieves aggregated probe points gathered and/or generated by UE 103 resulting from the travel of pedestrians 102 and vehicles 101 on a road segment. The trajectories database 109 stores a plurality of probe points and sequences thereof generated by different UE 103 over a period relative to a common road segment. A sequence of historic probe points specifies a trajectory—i.e., a path traversed by a probe on a road segment or other connected road segments over a period. The lane matching platform 107 analyzes the probe points to determine a spatial distance metric for each probe point. The spatial distribution may be further determined by accessing road segment information, such as from a geographical information system (i.e., a service 115), for specifying the features and attributes of the road segment. By way of example, the lane matching platform 107 performs non-Gaussian statistical analysis of aggregated historical probe point spatial distributions for a given road segment to identify or approximate its lanes. This exemplary process is depicted in FIG. 2.

Figure 2A:
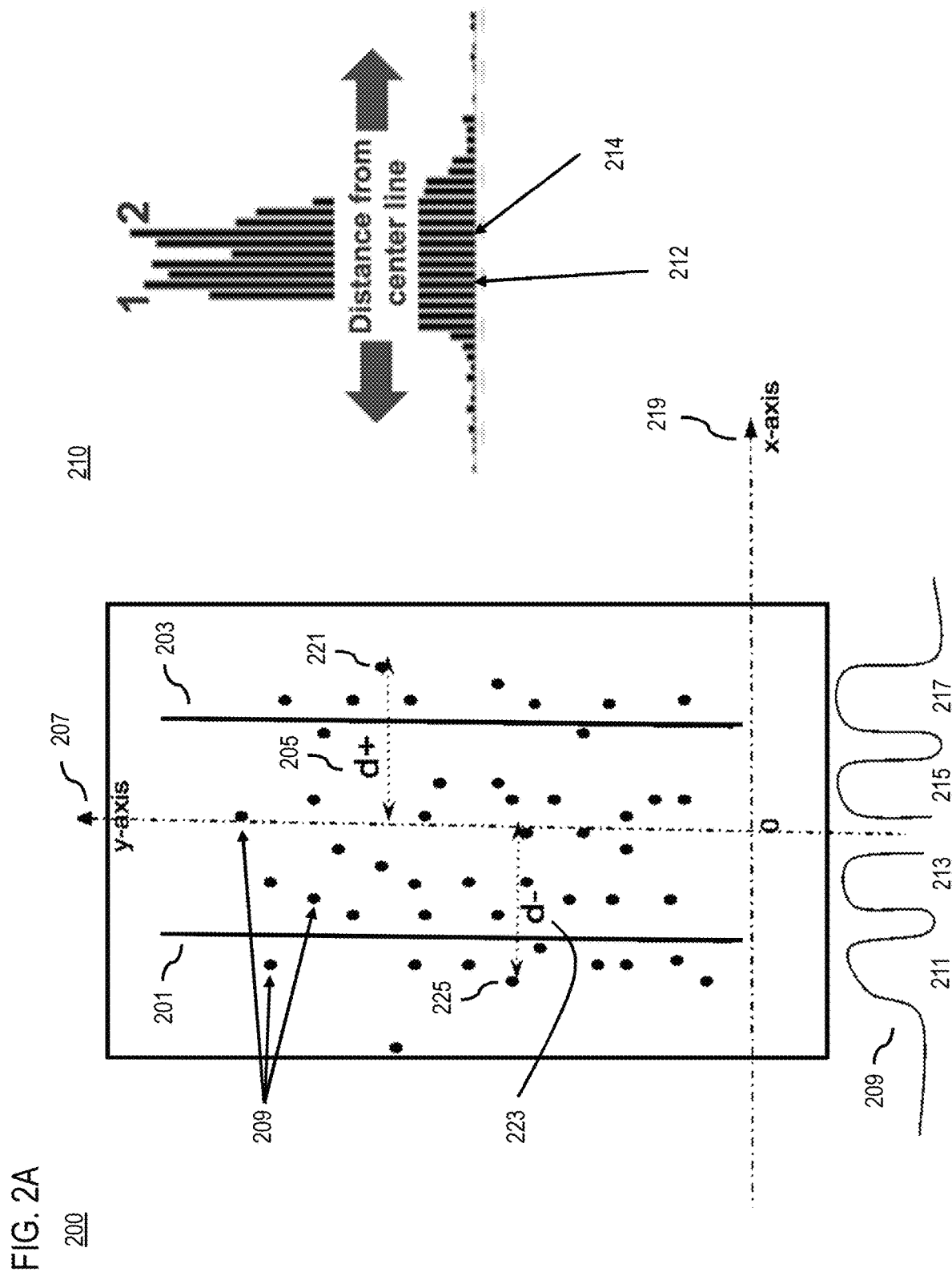
FIG. 2A is a diagram depicting a spatial distribution of probe data generated for a road segment having multiple lanes, according to one embodiment.

FIG. 2A is a diagram depicting a spatial distribution of probe data generated for a road segment having multiple lanes, according to one embodiment. The lane matching platform 107 determines the number of lanes of the road segment based on statistical analysis. Per this scenario, a two-dimensional visual representation of a road segment 200 is shown. The visual representation of the road segment 200 may be obtained by the lane matching platform 107 from a mapping service and the center line vector 207 may be placed at a midpoint of the road segment 200. In addition, the lane matching platform 107 may access the trajectories database 109 to acquire historical probe points generated by a plurality of UE 103 during travel on the road segment 200 for a period. The probe points (i.e., probe points 209) are shown as dots dispersed about the road segment 200. Each probe point corresponds to a specific location, position, speed, bearing, etc., of UE 103 at a specific time.

In one embodiment, the lane matching platform 107 places a center line vector 207 (labeled as the y-axis) at the midpoint of the road segment 200. Placement at the midpoint may be based on known attributes of the road segment, approximation, etc. The center line vector 207 matches the direction of travel of the respective historical probe points and the road segment 200. For the purpose of illustration, an x-axis 219 is also shown for depicting a negative/positive plane of the road segment.

In one embodiment, the lane matching platform 107 further determines a spatial distance d from the center line vector 207 of the road segment 200 to each of the plurality of probe points, i.e., probe points 209. As such, a cross-section of probes corresponding to a given spatial distance d from the center line vector 207 may be captured. By way of example, a spatial distance 205 represents a positive distance from the center line 207 to a probe point 221 while a spatial distance 223 represents a negative distance from the center line 207 to a probe point 225. The matching platform 107 determines the spatial distance of each of the probe points. In another embodiment, the matching platform 107 clusters the historical probe points into spatial distribution clusters based on their respective spatial distances. By way of example, the clusters are made up of historical probe points having similar spatial distances or of a value within a predetermined range of one another.

Clustering of the historical probe points results in lane-level grouping of probe points given that vehicles and pedestrians do not typically travel directly on lane lines. Also, pedestrians are typically found on the extremes of a road segment and not the center. Thus, the lane matching platform 107 may analyze the probe point distribution along a given road segment 200 and infer specific lane attributes and/or the status of a vehicle or pedestrian associated with the historical probe points.

In one embodiment, lane partitions may be determined based on observation of a spatial distance from the center line, as depicted per a Gaussian distribution model 210. By way of example, the Gaussian distribution model 210 is rendered for example a a histogram/multi-modality view 209 for indicating peaks and valleys of probe points. Hence, a given cross-section of the exemplary distribution model 210 corresponding to a spatial distance d represents a number of probe points, the lower peaks representing the fewest number while the highest peak represents the highest number of probe points. In this case, cross-sections 212 and 214 represent peak probe-points distributions labeled 1 and 2 respectively per model 210, while the cross-sections between 212 and 214 represent lower distributions. Thus, this multi-modality pattern gives an indication of lane-partitions on the road as the number of clusters obtained from represents an intrinsic number of lanes on the road represent.

In the case of the distribution of probe points along road segment 200, the lane matching platform 107 determines the existence of four lanes 211-217. As noted, each lane partition is determined based on the variance between the highest density (clustering) of cross-sections of historical probe points (common spatial distances versus the lowest density of historical probe points. While probe position accuracy may not sufficiently define a given lane of a road segment 200, clustering based on a spatial distance from the center line vector 207 is sufficient for identifying peak probe point locations/distributions/speed. In certain embodiments, the spatial distribution clusters may be stored (e.g., along with the lane count) as a lane model information in association with the road segment 200. Lane model information may be associated with mapping information for the road segment 200 to support subsequent inference and/or state determination analysis of probe points. This includes, for example, Hidden Markov Modeling (HMM), Viterbi algorithm processing or the like.

Figure 2B:
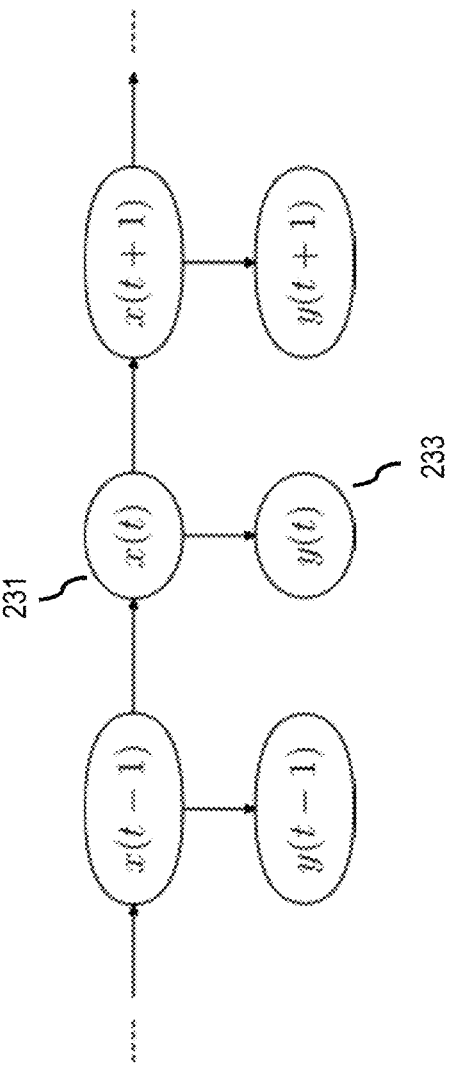
FIG. 2B is a diagram depicting a Hidden Markov Model, according to one embodiment.

FIG. 2B is a diagram depicting a Hidden Markov Model, according to one embodiment The lane matching platform 107 employs HMM to determine one or more of: (1) a likelihood each probe point or sequence thereof correlates to the determined model as specified per the lane model information; and/or (2) the most likely state and/or sequence of states of probe points that correlate to the model. The lane matching platform 107 encodes trips as HMMs, where the hidden states represent an operational state and/or a travel modality of a probe point, represented by a function x(t) per the model 230. The function y(t) represents the corresponding probe point for a given operational state/travel modality x(t), thus showing a 1:1 interdependent relationship. Per the model 230, the travel modality corresponds to a "pedestrian" transport mode or a "vehicle" transport mode.

It is noted, in certain embodiments, that the transport mode may also specify or be associated with a type of lane travelled on by a pedestrian or vehicle relative to a set of probe points produced, i.e., a "pedestrian" lane or "vehicle" lane. Still further, the HMM model 230 can be extended to handle more transport modes, vehicle types, lane types, etc. For example, the pedestrian state may be further uncovered per HMM analysis as a walking or running mode while the vehicle state may correspond to a bicycle, car, truck, bus, or taxi mode. For the purpose of illustration herein, the exemplary embodiments contemplate the generalized scenario wherein a probe point pertains to a pedestrian or a vehicle (or a motorized vehicle in general).

Figure 2C:
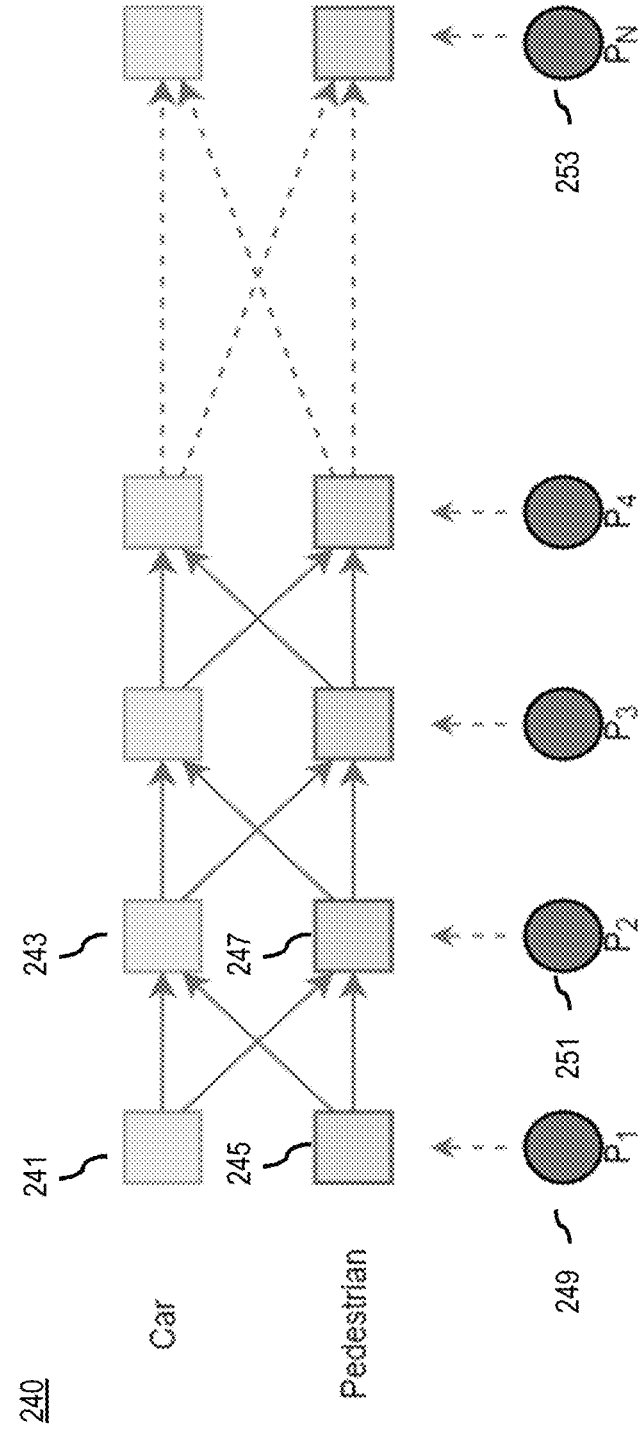
FIG. 2C is a diagram depicting possible transport mode transitions per Hidden Markov Modeling, according to one embodiment.

FIG. 2C is a diagram depicting possible transport mode transitions per Hidden Markov Modeling, according to one embodiment. The lane matching platform 107 enables sequences of state (transport type) changes resulting from mixed trips to be observed. Mixed trips include those where the UE 103 changes vehicle type or travel modality multiple times. An exemplary mixed trip is one where a person operates a navigation app on their smartphone while walking to their car and continues using the application while driving. Under this scenario, the state is determined to transition from a pedestrian state to a vehicle state.

In one embodiment, the lane matching platform 107 determines four transition probabilities. The state transition probabilities are shown in Table 1 below:

TABLE 1

| State-to-State Transition | Definition |
| --- | --- |
| 1) Car → Car | Probability of keeping the same vehicle/travel modality type between consecutive probe points |
| 2) Pedestrian → Pedestrian | |
| 3) Car → Pedestrian | Probability of changing vehicle/travel modality type between consecutive probe points |
| 4) Pedestrian → Car | |

The first transition possibility of Table 1 (Car→Car) is depicted in FIG. 2C as a transition from a vehicle, i.e., car 241 to the same car or another 243, resulting from a respective sequence of probe points 249 to 251 (P1→P2). The second transition possibility of Table 1 (Pedestrian-→Pedestrian) is as a transition from a pedestrian 245 to the same pedestrian or another 247, resulting from a respective sequence of probe points 249 to 251 (P1→P2). The third transition possibility (Car→Pedestrian) is as a transition from a car 241 to a pedestrian 247, resulting from a respective sequence of probe points 249 to 251 (P1→P2). The final transition possibility of Table 1 (Pedestrian→Car) is as a transition from a pedestrian 245 to a car 243, resulting from a respective sequence of probe points 249 to 251 (P1→P2). The lane matching platform 107 analyzes up to n sequences of probe points, e.g., probe point 253, for identifying/modeling the transport mode/state transition probabilities.

The HMM is defined by two parameters, including a transition probability and observation probability. The transition probability defines the likelihood the model (e.g., a lane model information produced by probe points y(t)) moves from a state x(t) to a state x(t+1). This corresponds to the mixed trip scenario, as modelled in FIG. 2B.

In the case where the same vehicle/travel modality type is maintained, the determined transitions probability should be very high (e.g. 0.9999). In the case where the vehicle/travel modality changes, which is allowed but unlikely, the determined probability should be very low (e.g. 0.0001). The transition probabilities are encoded in a transition matrix. For example, in the case of the aforementioned transition probabilities, the transition matrix would be:

$$\begin{bmatrix} 0.9999 & 0.0001 \\ 0.0001 & 0.9999 \end{bmatrix}$$

In one embodiment, the lane matching platform 107 determines the observation probability based on three factors: speed, lane-level position on the allowed transport mode/travel permissions for the road segment. The observation probability defines the likelihood of observing a datum (e.g., a probe point y(t)) given a certain state x(t) being observed per the lane model. This represents the likelihood of observing a probe point if the UE 103 x(t) producing it is in a vehicle state or pedestrian state. Once each probability is determined, the factors are combined by multiplying their probabilities as shown below:

$$P(probe|State)=P(speed|State)*P(laneDist|State)*P(permission|State)$$

Figure 2D:
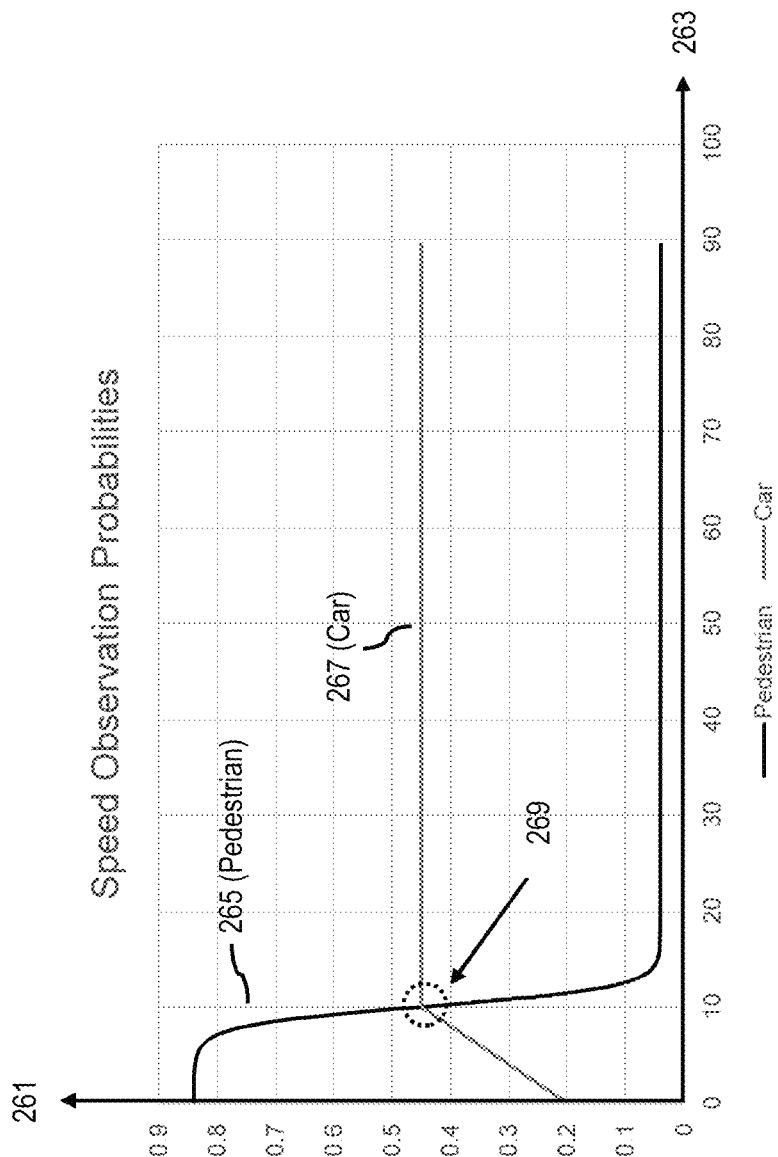
FIG. 2D is a diagram depicting a speed probability per Hidden Markov Modeling, according to one embodiment.

FIG. 2D is a diagram depicting a speed probability per Hidden Markov Modeling, according to one embodiment. The diagram is a graph showing a relationship between a speed of travel via an x-axis 263 and a probability value via a y-axis 261. Line 265 represents the pedestrian function while line 267 represents the vehicle (e.g., car) function.

By way of example, the speed observation probability, given above as P(speed|State), can be determined by the lane matching platform 107 based on the following assumptions:
A pedestrian has a speed within a specific range (e.g., 0 kph and 10 kph), where speeds over an upper limit (e.g., 10 kph) are unlikely to be executed by a pedestrian;
A vehicle (e.g., car) can drive at almost any speed; and
The probability of a pedestrian moving between 0 and 10 kph must be higher than the probability of a vehicle driving between 0 and 10 kph Based on these assumptions, the function for defining the pedestrian speed observation is:

$$P(speed|Pedestrian)=(\tan h(-\tfrac{1}{2}(x-10))+1.1)*0.4$$

This is graphically represented via line 265. It is noted that the process described above is provided by way of illustration and it is contemplated that any function or process (e.g., a step function) can be used to determine P(speed|State). In one embodiment, the parameters of the equation above (e.g., ½, 10, 1.1, and 0.4) are adjustable. For example, the parameters can be adjusted so that the resulting probability matches observed data. In yet another embodiment, the parameters can be "learned" using machine learning techniques or equivalent.

The function for defining the vehicle speed observation is a linear function, per line 267, that intersects the pedestrian probability function (line 265) at the upper limit (e.g., 10 Kph) at intersection point 269. The vehicle speed function, line 267, then continues at a constant value after the intersection point 269, corresponding to the increasing speed capabilities of a vehicle. It is noted that above described speed ranges and functions may be adapted to account for different vehicle types.

The travel permission (allowed transport mode) observation probability, given above as P(permission|State), is defined by the lane matching platform 107 as follows:
Assign a high probability value if the vehicle type is allowed on the road segment the probe is on (e.g., 0.999); and
Assign a very low value otherwise (e.g., 0.001).

Strict 0 and 1 probability values are avoided by the lane matching platform 107 to account for errors (e.g., map-matching errors) and provide for more probabilistic variability.

The lane matching platform 107 may rely on rules information regarding the road segment for assigning probabilities. Rules information may be acquired from a mapping service 115 in association the road segment. For example, mapping information for a road segment may specify a time in which the road segment is to be used as a bus lane versus a car lane, that the road segment is dedicated to pedestrian travel only, a dedicated bike lane, a carpool lane, etc.

The lane-level position probability, given above as P(laneDist|State), is determined by the lane matching platform 107 based, in part, on the lane matching/spatial distribution approach described previously. Per this approach, the number of lanes of a road segment are determined based on cross-section/clustering per the determined spatial distances. For HMM usage, the mean center of the extreme-right cluster is employed as the observation point for the pedestrian random variable (or transport mode) and the mean center of the combined number of clusters (and hence lanes)

forms the observation point for the vehicle random variable (or transport mode). Other additional features like speed is also used.

Figure 2E:
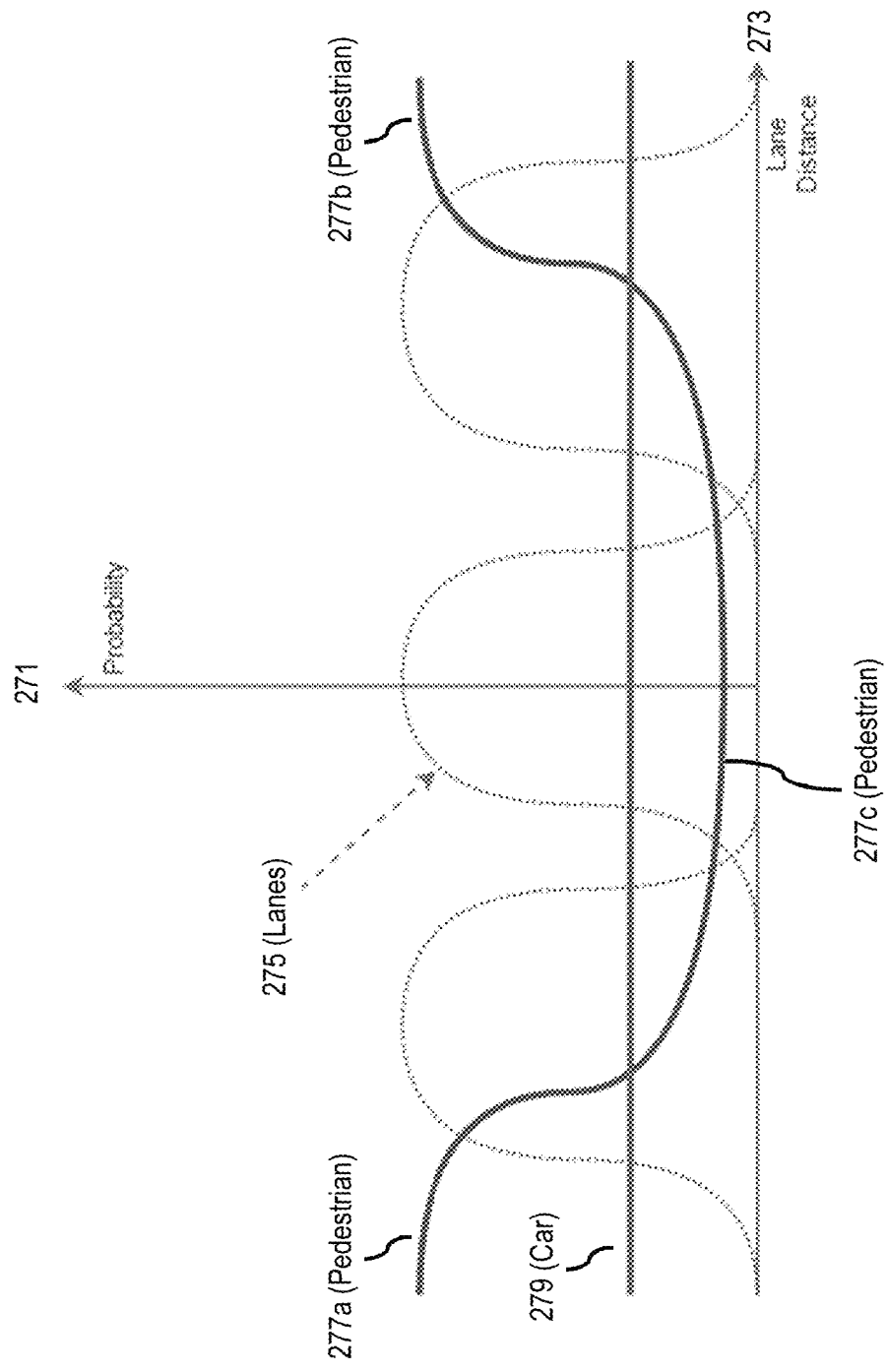
FIG. 2E is a diagram depicting a lane-level probability per Hidden Markov Modeling, according to one embodiment.

FIG. 2E is a diagram depicting a lane-level probability per Hidden Markov Modeling, according to one embodiment. In this case, a graph 270 is presented for indicating a relationship between a given lane probability on a y-axis 271 versus a lane distance on the x-axis 273. Lane distance corresponds to the determined spatial distances and lane-partitions as determined per FIG. 2A, i.e., for determining the number of lanes 275. The probability is based on a recognition by the lane matching platform 107 that pedestrians do not typically travel at the center of a road. Rather, pedestrian transport typically occurs on the extremes of a given road segment. Thus, graph 270 shows a higher probability of pedestrian transport being inferred at greater distances—i.e., at extreme distance points 277a and 277b. In contrast, the probability of pedestrian transport is less at a shorter distance from the center line 271 (y-axis) of the road segment—i.e., distance point 277c. A probability of pedestrian transport increases as the spatial distance from the center line vector increases, while the probability remains the same in the case of vehicle transport as per line 279 (e.g., any lane can potentially be a vehicle lane though less likely at distance extremes).

In certain embodiments, inference analysis is performed by way of Viterbi algorithm processing based on the above described HMI modeling approaches. For example, a sequence of current state transitions may be analyzed and/or further compared against the lane model information. As noted previously, the lane model information specifies the spatial cluster distribution/probe point pattern for a given road segment observed for a given period. Resultantly, a transport mode match and corresponding lane-level match is determined accordingly.

In certain embodiments, the lane matching platform may also determine a pedestrian flow pattern based on the aggregated lane model information. The pedestrian flow pattern may specify a volume of pedestrian travel, an average speed of pedestrian travel, upstream origin(s) and downstream destination(s) of pedestrian travel on the road segment, etc. It is noted that the pedestrian flow pattern can also be used as an observation probability to improve real-time map-matching of pedestrian probes.

The above described approach of the lane matching platform 107 may be employed in cases where lane information regarding a road segment is not available or defined. Still further, the lane matching platform 107 enables map matching of a current UE 103 to a specific lane position along with transport mode identification (pedestrian or vehicle). Based on this, the lane matching platform 107 may operate with various services 115 of the services platform 117, the content providers 119, or the like to support capabilities such as:

Traffic Estimation—the pedestrian probes points may be discarded when computing the average speed on a road segment for achieving a more accurate result;

City Planning and Pedestrian Analytics—determine average speed, popular origin destinations, pedestrian traffic hotspots and high density areas and any other pedestrian data analysis vital for city planning;

Map Discovery—use pedestrian state identification to discover which road segments have sidewalks, map crosswalks, pedestrian-only small alleys, pathways inside parks, bridges and crosswalks, etc.

Other applications and use cases may also be contemplated per the aforementioned functions of the lane matching platform 107.

The communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the lane matching platform 107 may be a platform with multiple interconnected components. The lane matching platform 107 may include multiple servers, intelligent networking devices, computing devices, components and corresponding software for determining one or more modal routes between one or more origin areas and one or more destination areas based on trajectory data. In addition, it is noted that the lane matching platform 107 may be a separate entity of the system 100, a part of the one or more services 115 of the services platform 117, or included within the UE 103 (e.g., as part of the applications 111).

The services platform 117 may include any type of service 115. By way of example, the services 115 may include mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 117 may interact with the lane matching platform 107, the UE 103, and/or the content provider 119 to provide the services 115.

In one embodiment, the content providers 119 may provide content or data to the vehicles 101 and/or UEs 103, the lane matching platform 107, and/or the services 115. The content provided may be any type of content, such as textual content, audio content, video content, image content, etc. In one embodiment, the content providers 119 may provide the one or more trajectories that contain one or more probe points located within the one or more origin areas and the one or more destination areas. In one embodiment, the content providers 119 may also store content associated with the vehicles 101, the UE 103, the lane matching platform 107, and/or the services 115. In another embodiment, the content providers 119 may manage access to a central repository of data, and offer a consistent, standard interface to data, such as a trajectories database, a repository of probe data, average travel times for one or more road links or travel routes (e.g., during free flow periods, day time periods, rush hour periods, nighttime periods, or a combination thereof), speed information for at least one vehicle, other traffic information, etc. Any known or still developing methods, techniques or processes for retrieving and/or accessing trajectory or probe data from one or more sources may be employed by the lane matching platform 107.

By way of example, the vehicles 101, the UEs 103, the lane matching platform 107, the services platform 117, and the content providers 119 communicate with each other and other components of the system 100 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 3:
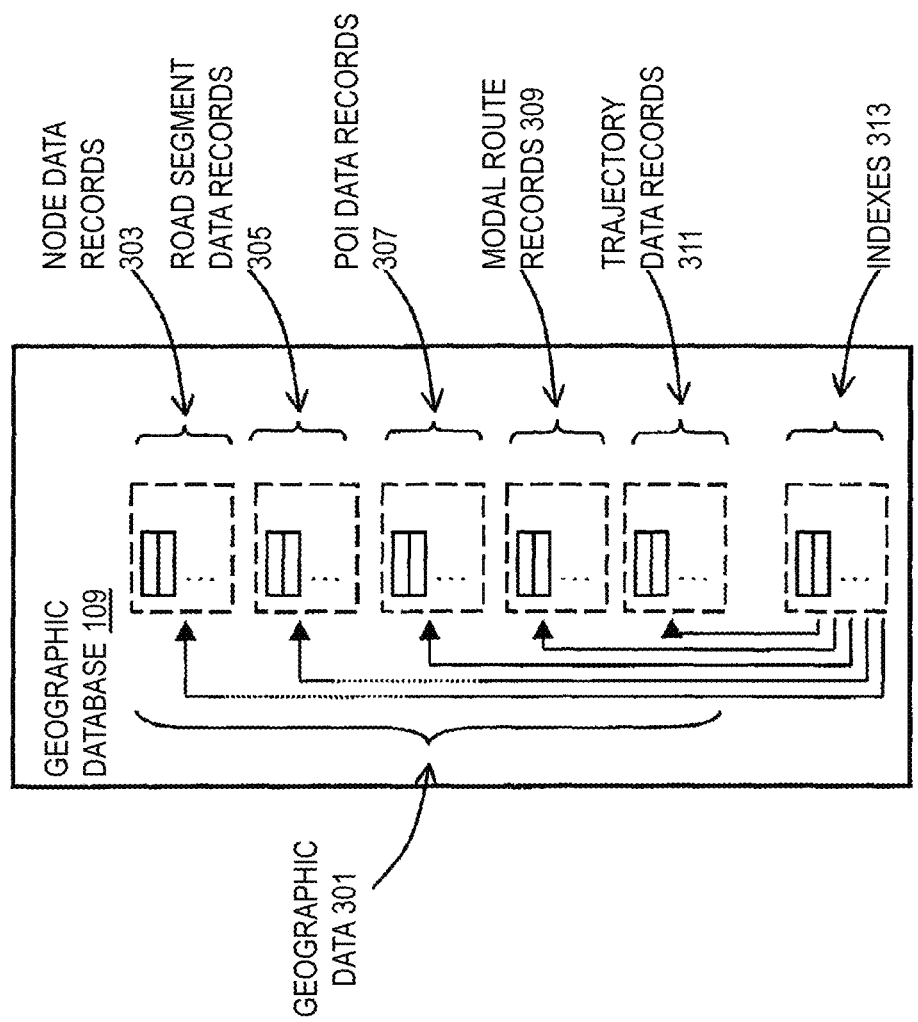
FIG. 3 is a diagram of a geographic database, according to one embodiment.

FIG. 3 is a diagram of the geographic database 109 of system 100, according to exemplary embodiments. In the exemplary embodiments, modal routes, trajectories (sequences of probe points), road segments, lane model information and/or other related information can be stored, associated with, and/or linked to the geographic database 109 or data thereof. In one embodiment, the geographic database 109 includes geographic data 301 used for (or configured to be compiled to be used for) mapping and/or navigation-related services, such as for personalized route determination, according to exemplary embodiments. For example, the geographic database 109 includes node data records 303, road segment or link data records 305, POI data records 307, modal route records 309, and trajectory data records 311, for example. More, fewer or different data records can be provided. In one embodiment, the other data records (not shown) can include cartographic ("carto") data records, routing data, and maneuver data. One or more portions, components, areas, layers, features, text, and/or symbols of the POI or event data can be stored in, linked to, and/or associated with one or more of these data records. For example, one or more portions of the trajectories or modal routes can be matched with respective map or geographic records via position or GPS data associations (such as using known or future map matching or geo-coding techniques), for example.

In exemplary embodiments, the road segment data records 305 are links or segments representing roads, streets, or paths, as can be used in the calculated route or recorded route information for determination of one or more personalized routes, according to exemplary embodiments. The node data records 303 are end points corresponding to the respective links or segments of the road segment data records 305. The road link data records 305 and the node data records 303 represent a road network, such as used by vehicles, cars, and/or other entities. Alternatively, the geographic database 109 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 307. The geographic database 109 can also include data about places, such as cities, towns, or other communities, and other geographic features, such as bodies of water, mountain ranges, etc. Such place or feature data can be part of the POI data records 307 or can be associated with POIs or POI data records 307 (such as a data point used for displaying or representing a position of a city).

In addition, the geographic database 109 can include data about determined modal routes and their respective origin and destination locations in the modal route records 309. By way of example, modal routes for different time periods and contexts (e.g., season, day of the week, time of day, mode of transportation, etc.) can be determined according the various embodiments described herein and stored in the modal route records 309 for subsequent retrieval or access. In addition, trajectory and/or probe data processed by the system 100 can be stored in the trajectory data records 311. For example, trimmed or simplified trajectories can be stored in the trajectory data records 311 for later retrieval or access.

The geographic database 109 can be maintained by the content provider 119 in association with the services platform 117 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 109 can be a master geographic database stored in a format that facilitates updating, maintenance, and development. For example, the master geographic database 109 or data in the master geographic database 109 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 109 can be a master geographic database, but in alternate embodiments, the geographic database 109 can represent a compiled navigation database that can be used in or with end user devices (e.g., vehicle 101, UE 103, etc.) to provide navigation-related functions. For example, the geographic database 109 can be used with the end user device to provide an end user with navigation features. In such a case, the geographic database 109 can be downloaded or stored on the end user device (e.g., vehicle 101, UE 103, etc.), such as in application 111, or the end user device can access the geographic database 109 through a wireless or wired connection (such as via a server and/or the communication network 105), for example.

In one embodiment, the end user device can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., UE 103) can be a cellular telephone. An end user can use the device navigation functions such as guidance and map display, for example, and for determination of route information to at least one identified point of interest, according to exemplary embodiments.

Figure 4:
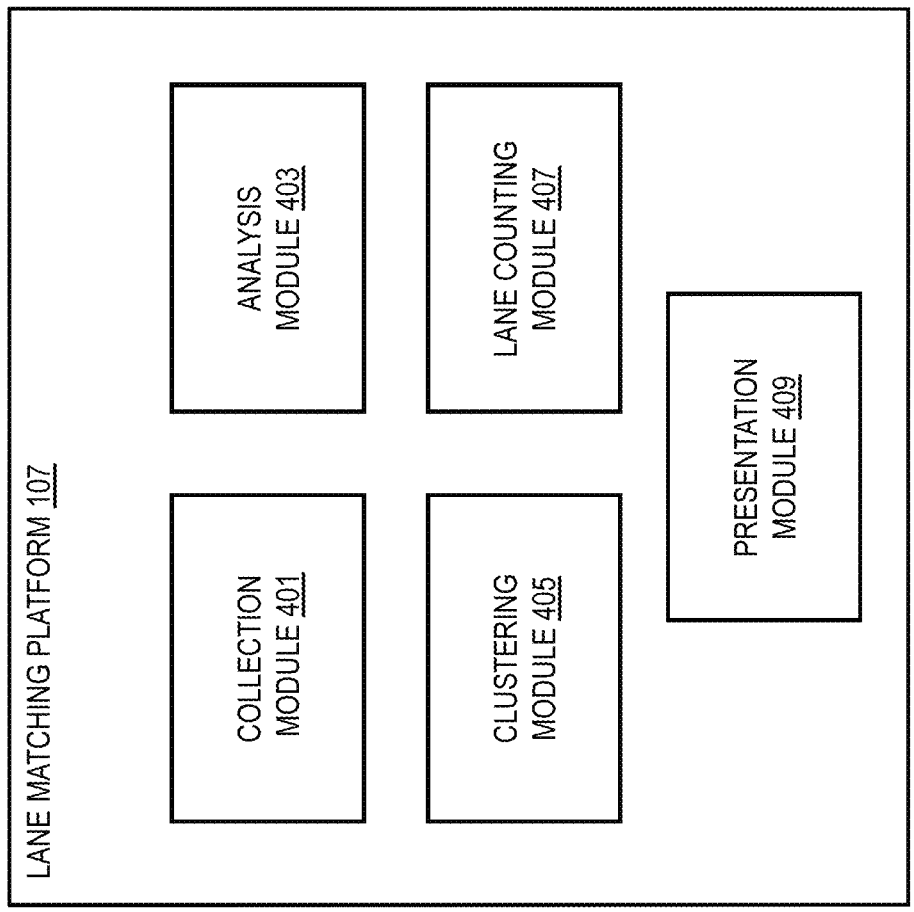
FIG. 4 is a diagram of the components of a lane matching platform, according to one embodiment.
Figure 5:
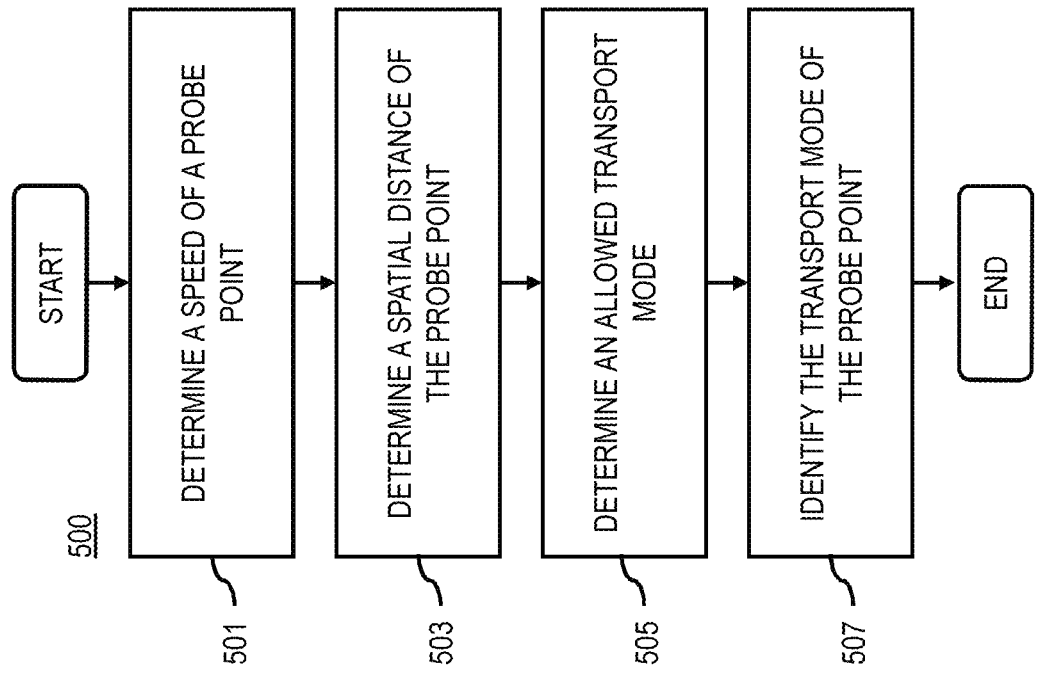
FIGS. 5 through 8 are flowcharts of a process for identifying a transport mode of a probe point, according to various embodiments.
Figure 6:
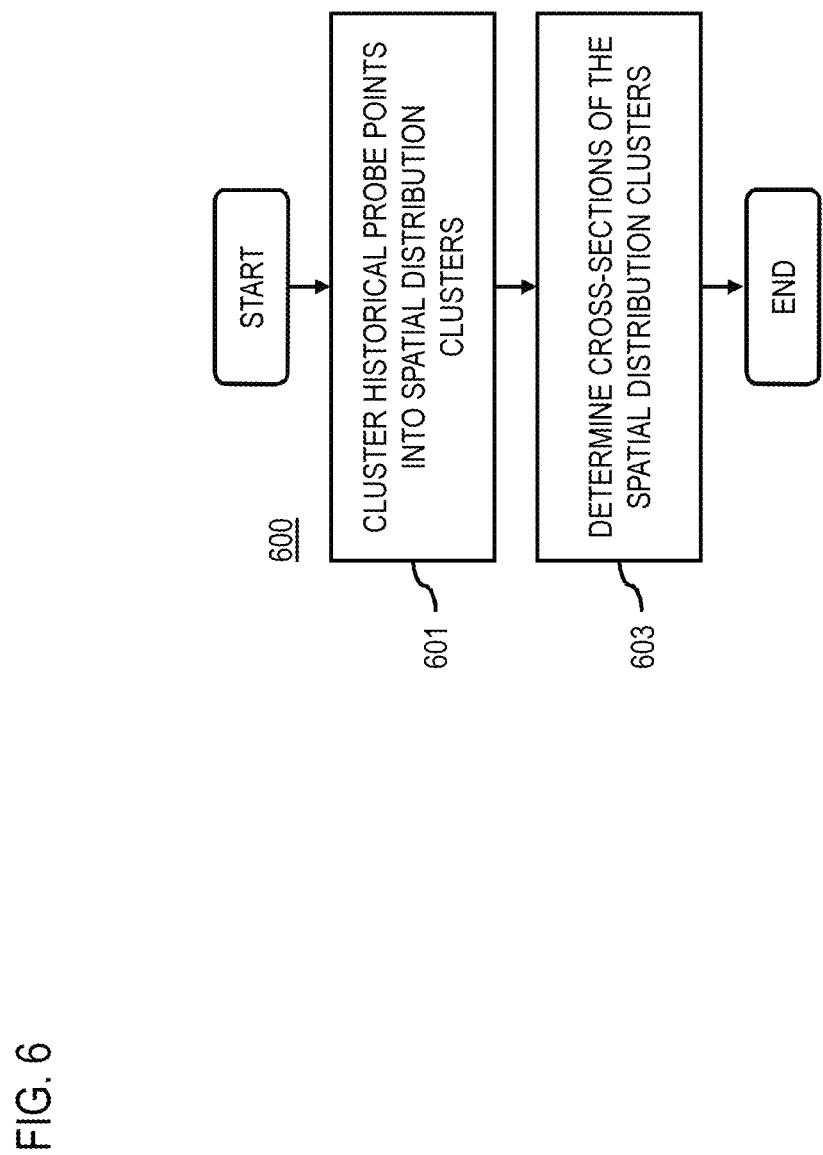
Figure 7:
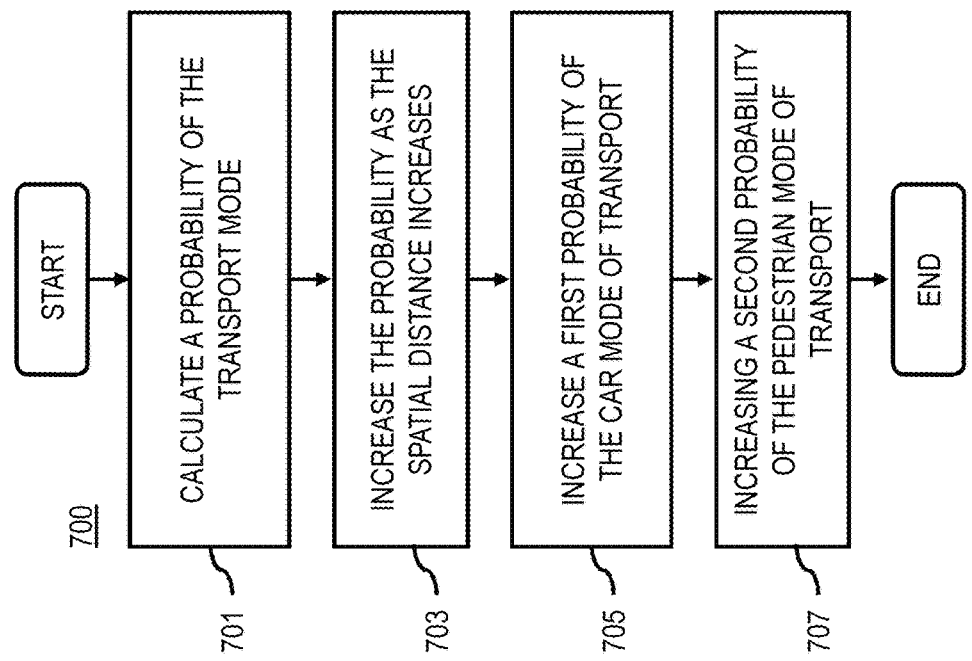
Figure 8:
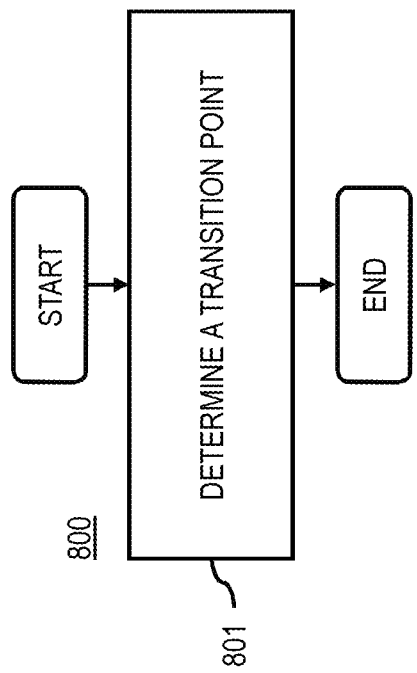

FIG. 4 is a diagram of the components of a lane matching platform, according to one embodiment. By way of example, the lane matching platform 107 includes one or more components for determining tunnel speed for a vehicle travelling through a tunnel. It is contemplated that the functions of these components may be combined or performed by other components of equivalent functionality. In this embodiment, the travel platform 107 includes a collection module 401, an analysis module 403, a clustering module 405, a counting module 407, and a presentation module 409.

In one embodiment, the collection module 401 may query a trajectories database 109 to retrieve one or more probe points associated with a given road segment. In addition, the collection module 401 collects probe points associated with one or more devices travelling the road segment. As such, the collection module 301 may retrieve singular probe points or a sequence of consecutive probe points for indicating a trajectory or probe point path. In one embodiment, the one or more probe points indicate a position, a heading, a speed, a time, or a combination thereof of each of the plurality of devices (e.g., the vehicle 101 and/or the UEs 103).

In one embodiment, the analysis module 403 determines a speed of a respective probe point as well as allowed transport mode associated with a road segment (e.g., pedestrian only lane). In addition, the analysis module 403 operates in conjunction with the clustering module 405 to generate spatial distribution clusters based on the respective spatial distances of probe points from a center line vector of the road segment. In one embodiment, the clustering module 405 stores the spatial distribution clusters as lane model information along with mapping information for the road segment, such as for subsequent retrieval and analysis.

In one embodiment, the analysis module 403 also interacts with a lane counting module 407 to determine a number of lanes to associate with a road segment. The lane counting module 407 identifies the number of lanes as the number of spatial distribution clusters generated by the clustering module 405. This includes determining one or more cross-sections of the partial distribution clusters. In one embodiment, the analysis module 403 also executes Hidden Markov Model analysis, Viterbi algorithm processing, etc. By way of example, the analysis module 403 facilitates matching of UE 103 determined to be travelling on a road segment by the collection module 401 with the specific lane of travel. Moreover, the analysis module 403 facilitates inference processing for identifying a specific transport mode to associate with the UE 103 during travel on the road segment.

In one embodiment, the presentation module 409 presents the determined lane-level information in association with relevant mapping information, navigation information or the like to a user interface of the requesting application 111. This includes, for example, data for indicating the pedestrian or vehicle transport mode associated with a UE 103 per the matching and inference process of the analysis module 403, a specific lane and lane position of the UE 103, etc. The presentation module 403 may operate in connection with the collection module 401 and clustering module 405 to facilitate the exchange of probe points and lane model information via the communication network 105 with respect to the services 109, content providers 115 and applications 111.

The above presented modules of the lane matching platform 107 can be implemented in hardware, firmware, software, or a combination thereof. Though depicted as a separate entity in FIG. 1, it is contemplated the lane matching platform 107 may be implemented for direct operation by respective UEs 103. As such, the lane matching platform 107 may generate direct signal inputs by way of the operating system of the UE 103 for interacting with the application 111. In another embodiment, one or more of the modules 401-409 may be implemented for operation by respective UEs as a platform, cloud based service, or combination thereof.

Figure 12:
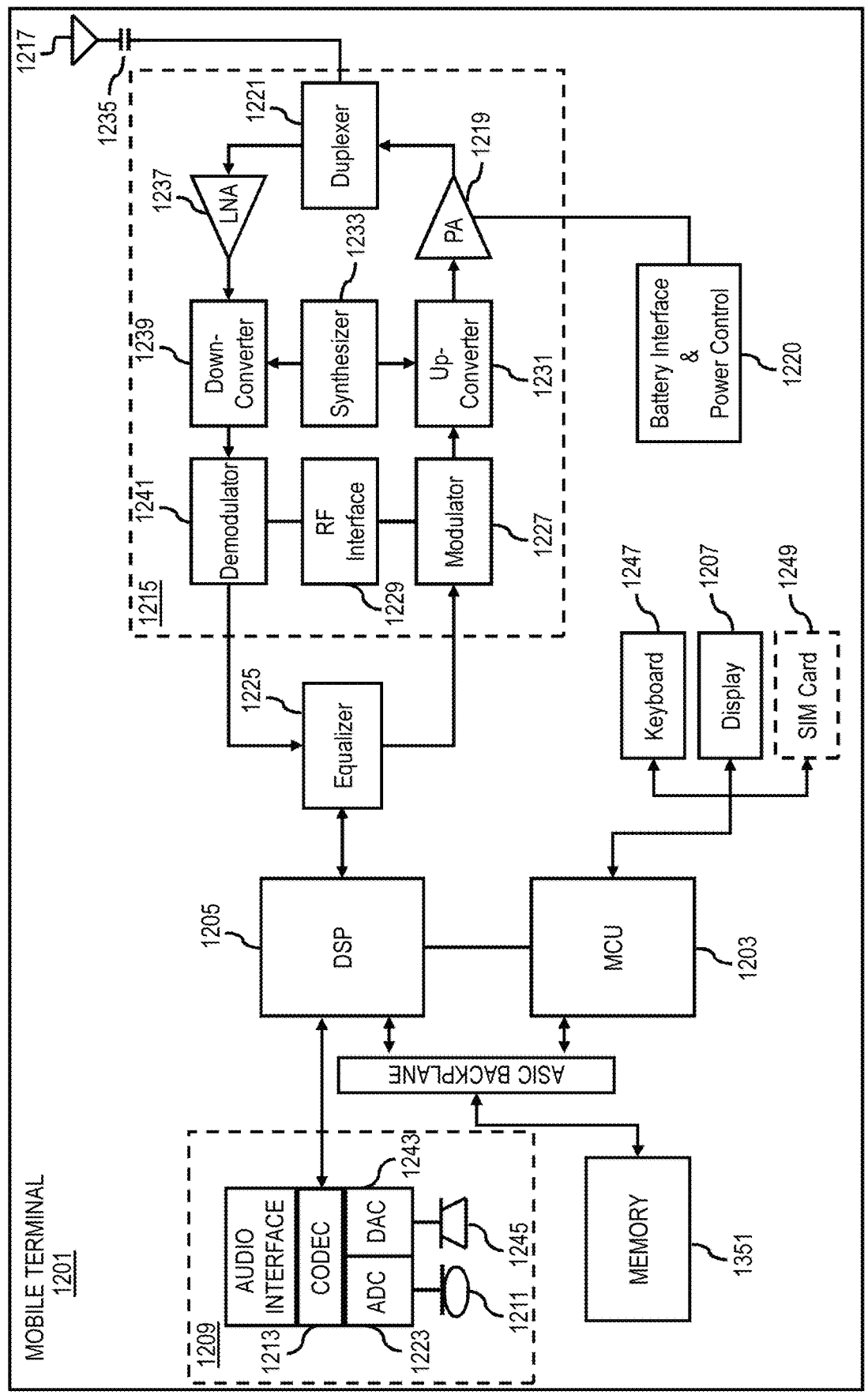
FIG. 12 is a diagram of a mobile terminal (e.g., handset) that can be used to implement an embodiment of the invention.

FIGS. 5 through 8 are flowcharts of a process for determining probe data generated by a device travelling on a road segment is for pedestrian travel, according to various embodiments. In one embodiment, the lane matching platform 107 performs processes 500, 600, 700, 800 and 900 and is implemented in, for instance, a chip set including a processor and a memory as shown in FIG. 12.

In step 501 of process 500, the lane matching platform 107 determines a speed of a probe point. In another step 503, the lane matching platform 107 determines a spatial distance of the probe point from a center line vector of a road segment. In another step 505, the lane matching platform determines an allowed transport mode for the road segment. In step 507, the lane matching platform 107 identifies the transport mode of the probe point based on the speed, the location of the probe point with respect to the center line, and the allowed transport mode. As noted previously, the allowed transport mode corresponds to a known and/or predetermined lane and/or transport mode type for the road segment of a lane thereof. Furthermore, the transport mode, the allowed transport mode, or a combination thereof includes a car transport mode or a pedestrian transport mode.

In step 601 of process 600 (FIG. 6), the lane matching platform 107 clusters a plurality of historical probe points into one or more spatial distribution clusters along a length of the road segment. In another step 603, the lane matching platform 107 determines the one or more spatial distribution clusters corresponds to one or more travel lanes of the road segment and the center line vector is based on a center line of the at least one of the spatial distribution clusters. As noted previously, the clustering is based on commonality of the spatial distances of respective probe points. In certain embodiments, the clustering may be performed in connection with HMM processing techniques and stored as lane model information. Also, the lane model information may be provided an input or reference data for performing HMM or Viterbi processing. The one or more spatial distribution clusters corresponds to one or more travel lanes of the road segment and the center line vector is based on a center line of the at least one of the spatial distribution clusters.

In step 701 of process 700 (FIG. 7), the lane matching platform 107 calculates a probability the probe point is either the car transport mode or the pedestrian transport mode based on the spatial distance. In another step 703, the lane matching platform 107 increases the probability as the spatial distance from the center line vector increases. This corresponds to increased probability of the pedestrian transport mode as the distance from the center of the road towards the edges increases.

In step 705, the lane matching platform 107 increases a first probability the mode of transport is the car mode of transport based on a determination the allowed transport mode is a car transport mode. Per step 707, the lane matching platform 107 increases a second probability the mode of transport is the pedestrian mode of transport based on a determination the allowed transport mode is a pedestrian transport mode. The transport mode of the probe point is further based on the first probability, the second probability, or a combination thereof.

In steps 801 of process 800 (FIG. 8), the lane matching platform 107 determines a transition point between a first transport mode and a second transport mode during the sequence. The probe point is part of a sequence of probe points generated by a probe device and the sequence of probe points is a mixed mode sequence comprising a plurality of transport modes. Respective transport modes of a plurality of other probe points occurring in the sequence of probe points before or after the transition point is identified based on the transport mode identified for the probe point at the transition point. As noted previously, hidden state modeling may be performed to determine the transition point of an associated probe. Still further, an inference algorithm may be executed against the sequence based on the lane model information, such as via a Viterbi algorithm.

It is further noted, in certain embodiments, that the lane matching platform 107 may present the transport mode of a probe point, the determined transition point, etc., in conjunction with relevant mapping information for the corresponding road segment. Still further, the probe points, lane model information and clusters may be aggregated and analyzed subsequently for analysis to determine pedestrian traffic flow, road segment patterns, etc.

Figure 9A:
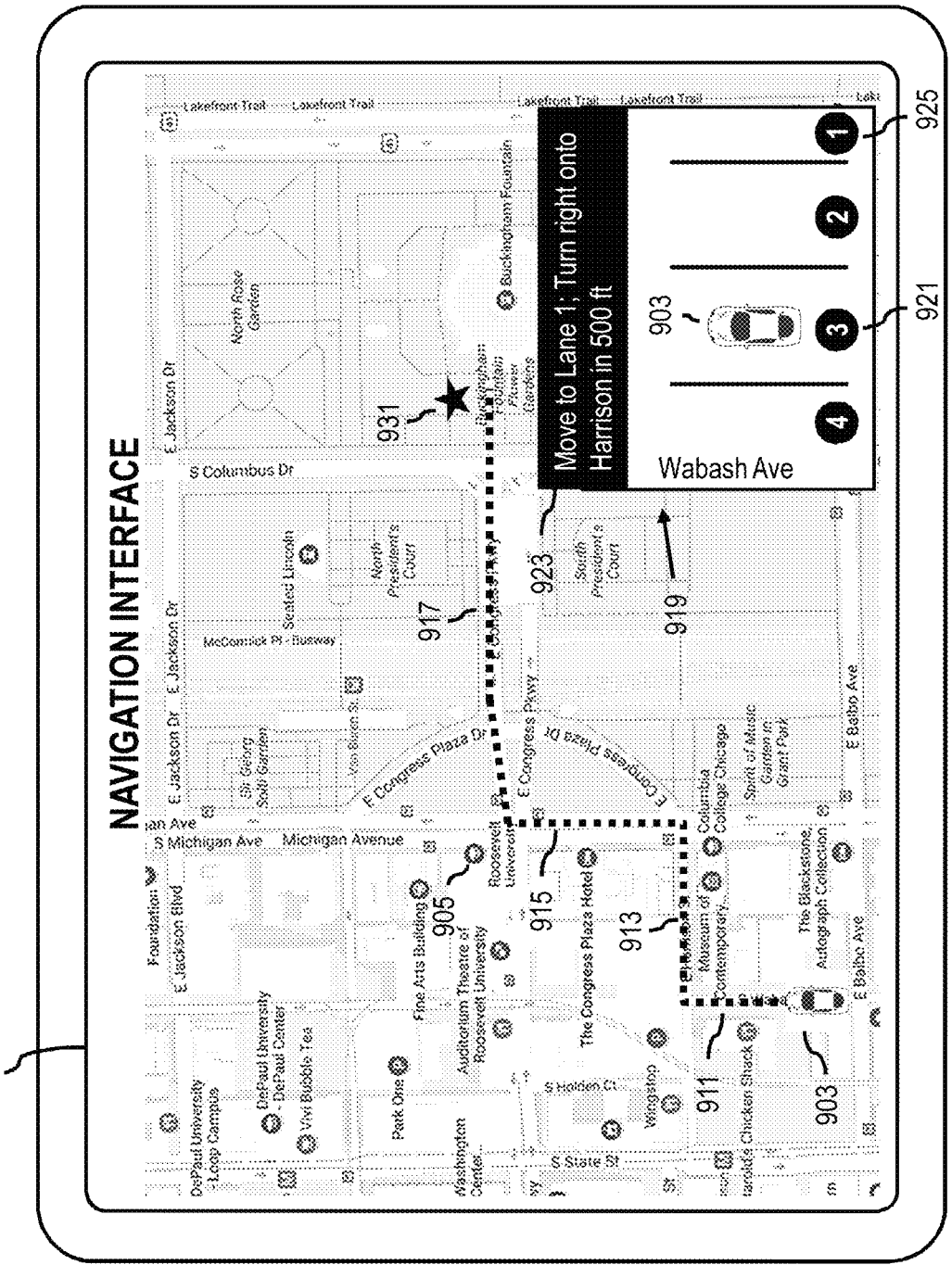
FIGS. 9A and 9B are diagrams depicting a use case example of probe data being matched to pedestrian and vehicular travel for presentment to a device, according to various embodiments.
Figure 9B:
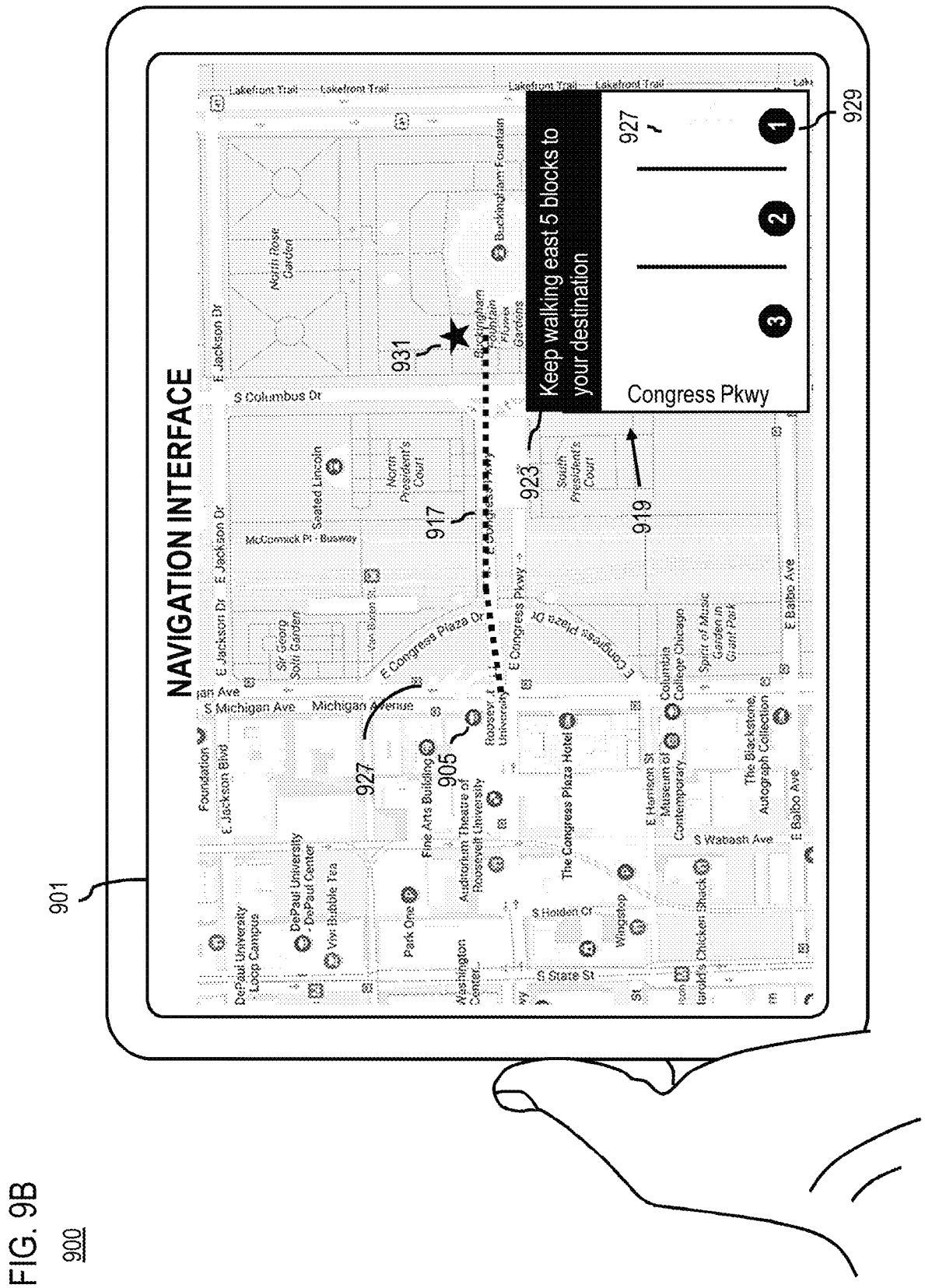

FIGS. 9A and 9B are diagrams depicting a use case example of probe data being matched to pedestrian and vehicular travel for presentment to a device, according to various embodiments. For the purpose of illustration, the diagrams are described with respect to a user of a mobile device 900 equipped with a navigation application. The navigation application is configured for interaction with the lane matching platform 107 for enabling the presentment of lane-level detail and transport mode information to the device display 901 as the user navigates to a desired destination 931.

In FIG. 9A, the user employs the device 900 to run a navigation application as they drive to a busy/popular tourist attraction 931 (e.g., Buckingham Fountain). The device is equipped with sensors for acquiring, generating and/or sharing telemetry data, GPS probe points, etc., with the lane matching platform 107. Under this scenario, the navigation application presents various road segments within a zoomed-out map view for providing real-time guidance to the user of the device 900 to the destination 931. In this case, a combination of road segments 911, 913, 915 and 917 are highlighted within the map view for specifying the recommended travel path to be driven.

Per the lane matching platform 107, prior generated lane model information is already associated with the road segment. As such, the lane matching platform 107 processes the lane model information (e.g., via known HMI processing techniques) to match the device 900 to a specific lane of travel of the user and infer the transport mode of the device. Resultantly, a vehicle icon 903 is rendered to the display 901 for denoting the current transport mode (state) and location/position of the user's vehicle relative to the map. In addition, a zoomed-in view 919 is also presented, as an inset or picture-in-picture view, for providing additional lane-level detail to the user. The zoomed-in view shows the vehicle icon 903 as positioned in a third lane 921 of the four-lane road segment (e.g., Wabash Ave) upon which the vehicle is driving. A driving instruction 923 is also presented within the zoomed-in view 919 for recommending the user (driver) move to the second lane given an impending right turn onto Harrison Street.

In this example, placement of the vehicle icon 903 into the third lane 921 indicates the lane as a vehicle lane of the road segment. The first lane 925, which corresponds to a more narrowly scaled pedestrian lane, is also presented. While not shown herein, the first lane 925 may be highlighted by the navigation application based on awareness of the respective lane types/states, i.e., to indicate driving on the pedestrian lane is prohibited.

Per this scenario, the user proceeds along the route and eventually travels along road segments 911, 913. The user nearly completes travel along road segment 915 when they notice slowing traffic and an obstruction at the link to road segment 917 (e.g., Congress Parkway); the road segment onto which they are to make a right turn. They observe (or are presented with information via the navigation service or a traffic service) that the street 917 is blocked from through vehicle traffic due to a festival. As only pedestrian travel is allowed along the road segment 917, the user parks the vehicle at location 905 and proceeds to the destination on foot. This corresponds to a mixed trip scenario as described previously, where the lane matching platform 107 remains active throughout travel for detecting a change in transport mode of the device and/or modality of travel. The interaction between the device 901 and the lane matching platform 107 as a result of the state transition is depicted in FIG. 9B.

As the user navigates along road segment 917 on foot, the lane matching platform 97 detects the transition from a vehicle transport mode to a pedestrian transport mode. Based on this determination, the navigation application renders a pedestrian icon 927 to the display instead of the vehicle icon 903. The transition is also denoted via the zoomed-in view 919, which presents an updated instruction 923 pertaining to the walking transport mode of the user. Moreover, the zoomed-in view 919 shows the pedestrian icon 927 as being placed in a first lane 929 of the road segment 917, thus indicating lane 929 as a pedestrian lane.

While not shown expressly herein, the vehicle icon 903 or pedestrian icon 927 can be presented in any other form, including textually or audibly. Moreover, the location/position of a respective icon 903 or 927 within a particular lane may be adapted to reflect the actual probe point location determination. For example, in the case where the user walks close to the edge of lane 1 and near lane 2, the pedestrian icon 917 as presented would be skewed left (by a spatial distance d) to depict the position of the device user within the lane.

Still further, in future embodiments, it is contemplated that transport mode information and/or lane-level details regarding associated travelers may also be presented in connection with a requesting user device 900. For example, in the case where the user is in shared navigation mode with another user that is driving while they are walking, the representative transport mode icons would be different for each user. In this case, the user's device would present a pedestrian icon 927 relative to their position/location while the other user's icon would be presented to the user as a vehicle icon 903 relative to the other user's position/location.

Still further, while not shown expressly, the aggregated (persistently updated) lane model information—reflective of the probe points/spatial distribution patterns—may be subsequently retrieved. For example, the lane model information may be subsequently analyzed in connection with relevant mapping information, traffic information, event data, by the city planning department that hosted the festival (per the above scenario) to ascertain traffic patterns, plan alternative or optimized pedestrian routes, observe the most popular POIs, etc. Alternatively, said information can be retrieved by an autonomous vehicle navigation service or event service for providing near-real time travel instructions, event recommendations (e.g., most popular food vendor based on foot traffic density), resources planning recommendations (e.g., least frequented portable restroom and thus most available based on limited foot traffic density).

The processes described herein for determining probe data generated by a device travelling on a road segment is for pedestrian travel may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
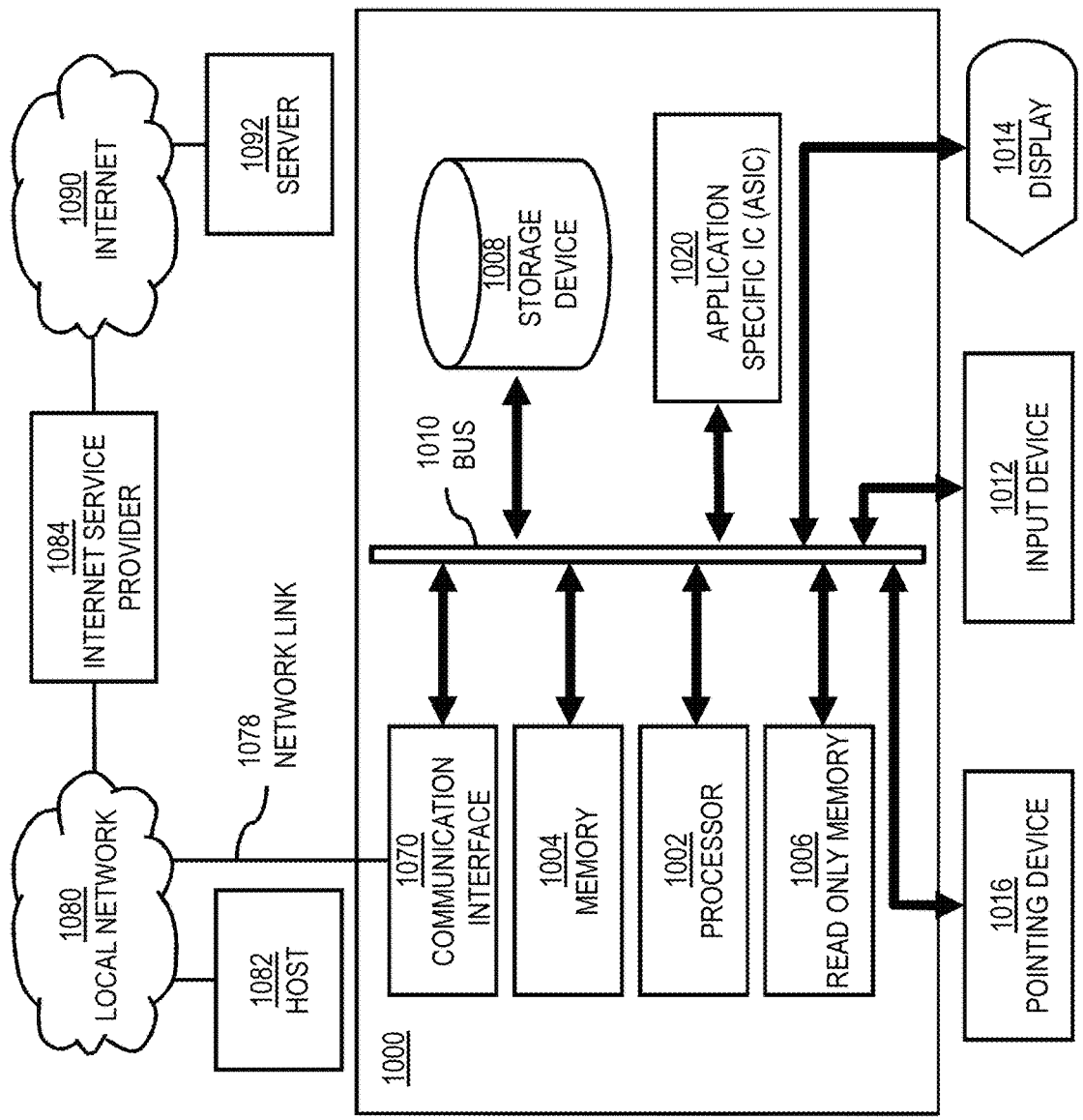
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to determine probe data generated by a device travelling on a road segment is for pedestrian travel as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of determining probe data generated by a device travelling on a road segment is for pedestrian travel.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to determine probe data generated by a device travelling on a road segment is for pedestrian travel. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for determining probe data generated by a device travelling on a road segment is for pedestrian travel. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for determining probe data generated by a device travelling on a road segment is for pedestrian travel, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general, the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for determining probe data generated by a device travelling on a road segment is for pedestrian travel to the UE 103.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
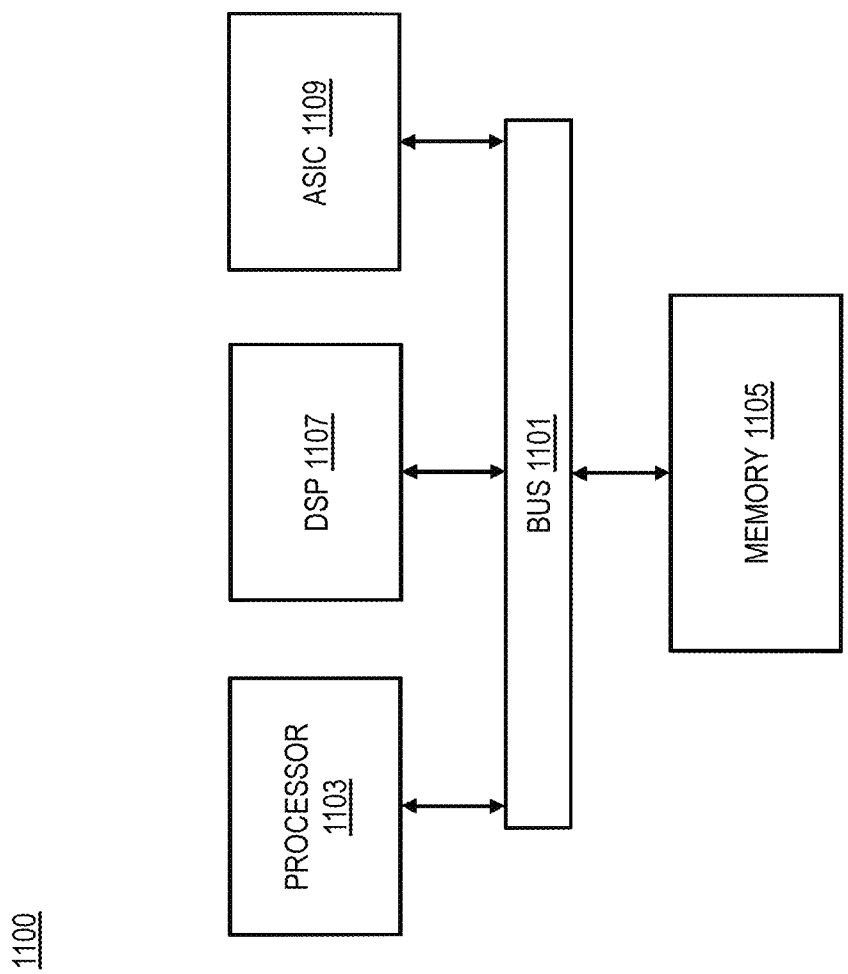
FIG. 11 is a diagram of a chip set that can be used to implement an embodiment of the invention.

FIG. 11 illustrates a chip set or chip 1100 upon which an embodiment of the invention may be implemented. Chip set 1100 is programmed to determine probe data generated by a device travelling on a road segment is for pedestrian travel as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of determining probe data generated by a device travelling on a road segment is for pedestrian travel.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively, or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to determine probe data generated by a device travelling on a road segment is for pedestrian travel. The memory 1105 also stores the data associated with or generated by the execution of the inventive steps.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of determining probe data generated by a device travelling on a road segment is for pedestrian travel. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of determining probe data generated by a device travelling on a road segment is for pedestrian travel. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to determine probe data generated by a device travelling on a road segment is for pedestrian travel. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for identifying a transport mode of a probe point comprising:
    determining, by a processor, a speed of a probe point;
    determining, by the processor, a spatial distance of the probe point from a center line vector of a road segment;
    determining, by the processor, an allowed transport mode for the road segment; and
    identifying, by the processor, the transport mode of the probe point based on the speed, the spatial distance, and the allowed transport mode,
    wherein the transport mode, the allowed transport mode, or a combination thereof includes a car transport mode or a pedestrian transport mode.

2. The method of claim 1, further comprising:
    clustering a plurality of historical probe points into one or more spatial distribution clusters along a length of the road segment; and
    determining one or more cross-sections of the one or more spatial distribution clusters with respect to the length of the road segment,
    wherein the one or more spatial distribution clusters corresponds to one or more travel lanes of the road segment and the center line vector is based on a center line of the at least one of the spatial distribution clusters.

3. The method of claim 1, further comprising:
    calculating a probability the probe point is either the car transport mode or the pedestrian transport mode based on the spatial distance,
    wherein the transport mode of the probe point is further based on the probability.

4. The method of claim 3, wherein the probability is a probability the probe point is a pedestrian transport mode, the method further comprising:
    increasing the probability as the spatial distance from the center line vector increases.

5. The method of claim 1, further comprising:
    determining a first probability the probe point is using the car transport mode based on the speed of the probe point; and
    determining a second probability the probe point is using the pedestrian mode based on the speed of the probe point,
    wherein the transport mode of the probe point is further based on the first probability, the second probability, or a combination thereof.

6. The method of claim 1, further comprising:
    increasing a first probability the mode of transport is the car mode of transport based on a determination the allowed transport mode is a car transport mode; and
    increasing a second probability the mode of transport is the pedestrian mode of transport based on a determination the allowed transport mode is a pedestrian transport mode,
    wherein the transport mode of the probe point is further based on the first probability, the second probability, or a combination thereof.

7. The method of claim 1, wherein the probe point is part of a sequence of probe points generated by a probe device and wherein the sequence of probe points is a mixed mode sequence comprising a plurality of transport modes.

8. The method of claim 7, further comprising:
    determining a transition point between a first transport mode and a second transport mode during the sequence,
    wherein the probe point occurs at the transition point.

9. The method of claim 8, wherein respective transport modes of a plurality of other probe points occurring in the sequence of probe points before or after the transition point is identified based on the transport mode identified for the probe point at the transition point.

10. An apparatus for determining pedestrian travel comprising:
    at least one processor; and
    at least one memory including computer program code for one or more programs,
    the at least one memory and the computer program code configured to, with the at least one processor, cause the apparatus to perform at least the following,
    determine a speed of a probe point;
    determine a spatial distance of the probe point from a center line vector of a road segment;
    determine an allowed transport mode for the road segment; and
    identify the transport mode of the probe point based on the speed, the spatial distance, and the allowed transport mode,
    wherein the transport mode, the allowed transport mode, or a combination thereof includes a car transport mode or a pedestrian transport mode.

11. The apparatus of claim 10, wherein the apparatus is further caused to:
    cluster a plurality of historical probe points into one or more spatial distribution clusters along a length of the road segment; and
    determine one or more cross-sections of the one or more spatial distribution clusters with respect to the length of the road segment,
    wherein the one or more spatial distribution clusters corresponds to one or more travel lanes of the road segment and the center line vector is based on a center line of the at least one of the spatial distribution clusters.

12. The apparatus of claim 11, wherein the step of matching is further caused to:
calculate a probability the probe point is either the car transport mode or the pedestrian transport mode based on the spatial distance,
wherein the transport mode of the probe point is further based on the probability.

13. The apparatus of claim 12, wherein the probability is a probability the probe point is a pedestrian transport mode, the apparatus further caused to:
increase the probability as the spatial distance from the center line vector increases.

14. The apparatus of claim 10, wherein the apparatus is further caused to:
determine a first probability the mode of transport is the car mode of transport based on a determination the allowed transport mode is a car transport mode; and
determine a second probability the mode of transport is the pedestrian mode of transport based on a determination the allowed transport mode is a pedestrian transport mode,
wherein the transport mode of the probe point is further based on the first probability, the second probability, or a combination thereof.

15. The apparatus of claim 10, wherein the apparatus is further caused to:
increase a first probability the mode of transport is the car mode of transport based on a determination the allowed transport mode is a car transport mode; and
increase a second probability the mode of transport is the pedestrian mode of transport based on a determination the allowed transport mode is a pedestrian transport mode,
wherein the transport mode of the probe point is further based on the first probability, the second probability, or a combination thereof.

16. The apparatus of claim 15, wherein the apparatus is further caused to:
determine a transition point between a first transport mode and a second transport mode during a sequence of probe points generated by a probe device,
wherein the probe point occurs at the transition point and is part of the sequence of probe points and wherein the sequence of probe points is a mixed mode sequence comprising a plurality of transport modes.

17. A non-transitory computer-readable storage medium carrying one or more sequences of one or more instructions which, when executed by one or more processors, cause an apparatus to at least perform the following steps:
determining, by a processor, a speed of a probe point;
determining, by the processor, a spatial distance of the probe point from a center line vector of a road segment;
determining, by the processor, an allowed transport mode for the road segment; and
identifying, by the processor, the transport mode of the probe point based on the speed, the spatial distance, and the allowed transport mode,
wherein the transport mode, the allowed transport mode, or a combination thereof includes a car transport mode or a pedestrian transport mode.

18. The non-transitory computer-readable storage medium of claim 17, wherein the apparatus is further caused to perform:
clustering a plurality of historical probe points into one or more spatial distribution clusters along a length of the road segment; and
determining one or more cross-sections of the one or more spatial distribution clusters with respect to the length of the road segment,
wherein the one or more spatial distribution clusters corresponds to one or more travel lanes of the road segment and the center line vector is based on a center line of the at least one of the spatial distribution clusters.

19. The non-transitory computer-readable storage medium of claim 17, wherein the step of matching is further caused to perform:
determining a transition point between a first transport mode and a second transport mode during a sequence of probe points generated by a probe device,
wherein the probe point occurs at the transition point and is part of the sequence of probe points and wherein the sequence of probe points is a mixed mode sequence comprising a plurality of transport modes.

20. The non-transitory computer-readable storage medium of claim 19, wherein respective transport modes of a plurality of other probe points occurring in the sequence of probe points before or after the transition point is identified based on the transport mode identified for the probe point at the transition point.

* * * * *